Sept. 20, 1971                J. C. DUNAWAY                 3,606,165
                    JET REACTION CONTROL SYSTEM FOR ROCKETS
Filed Nov. 6, 1969                                    2 Sheets-Sheet 1

J. C. Dunaway,
INVENTOR
BY Harry M. Saragnitz
   Edward J. Kelly
   Herbert Berl
   Harold W. Hilton J. C. Dunaway,
INVENTOR

United States Patent Office 3,606,165
Patented Sept. 20, 1971

3,606,165
JET REACTION CONTROL SYSTEM FOR ROCKETS
J. C. Dunaway, Falkville, Ala., assignor to the United States of America as represented by the Secretary of the Army
Filed Nov. 6, 1969, Ser. No. 874,607
Int. Cl. B63h *25/46;* B64c *15/10*
U.S. Cl. 239—265.17                                7 Claims

ABSTRACT OF THE DISCLOSURE

A jet reaction attitude control system for rockets wherein high velocity gases are bled from points in the divergent cone of a supersonic rocket nozzle and selectively directed through ducts to exit the nozzle normal to the centerline thereof to provide a control force on the rocket.

BACKGROUND OF THE INVENTION

Conventionally, bleed systems which are utilized for attitude control of a rocket provides for bleeding the gas off at high pressure and low velocity directly from the combustion chamber into valves which control the gas. Such high pressure and high temperature gases usually contain sufficient solid particles which clog and erode the valves to reduce the efficiency thereof.

SUMMARY OF THE INVENTION

Apparatus of the present invention provides a plurality of ducts disposed in communication with the interior of a rocket motor nozzle. The ducts are disposed about the motor adjacent the exit cone thereof. Each duct is provided with a control port for injecting a secondary control fluid therein for selectively diverting the rocket's motor exhaust gases to provide control forces on the rocket.

It is therefore, an object of the present invention to provide an attitude control system for a rocket.

It is a further object to provide such a control system utilizing gases bled from the rocket motor for providing the control function.

It is an additional object of the present invention to provide such control mechanism with gases obtained from a region of the exhaust nozzle which will provide gases at high velocity and low pressure.

It is still another object of the present invention to provide means for selectively directing said gases in directions substantially normal to the axis of the rocket motor to provide control forces on the rocket.

These and other objects of the present invention will become more obvious when taken in conjunction with the following drawings and description.

DESCRIPTION OF THE PREFERRED EMBODIMENTS

Figure 1:
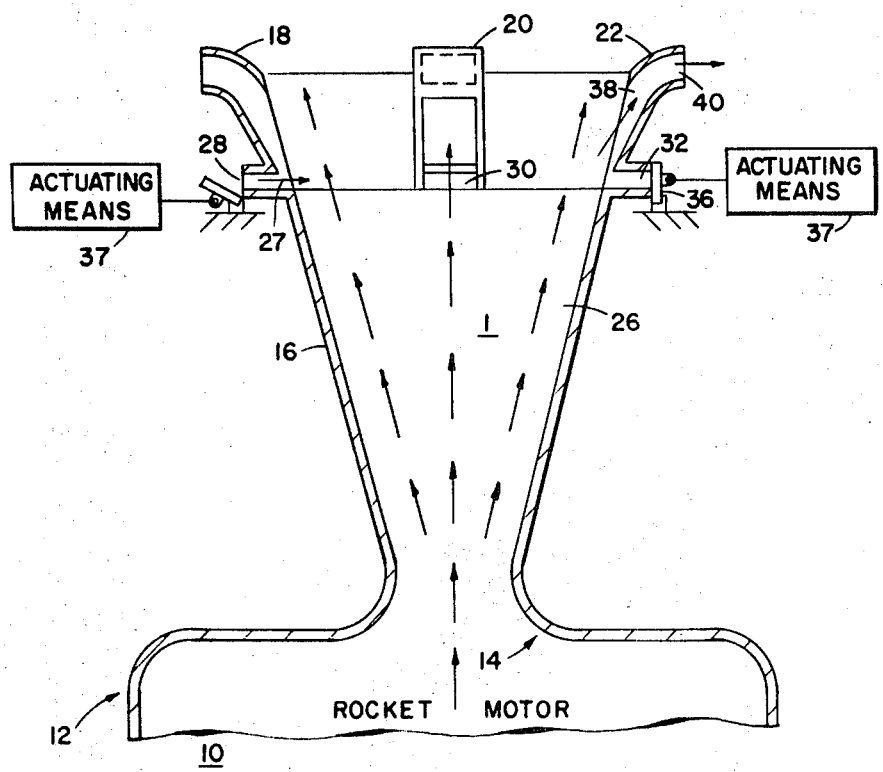
FIG. 1 is an elevational sectional view illustrating the control ducts mounted adjacent the exit cone of the rocket nozzle.
Figure 2:
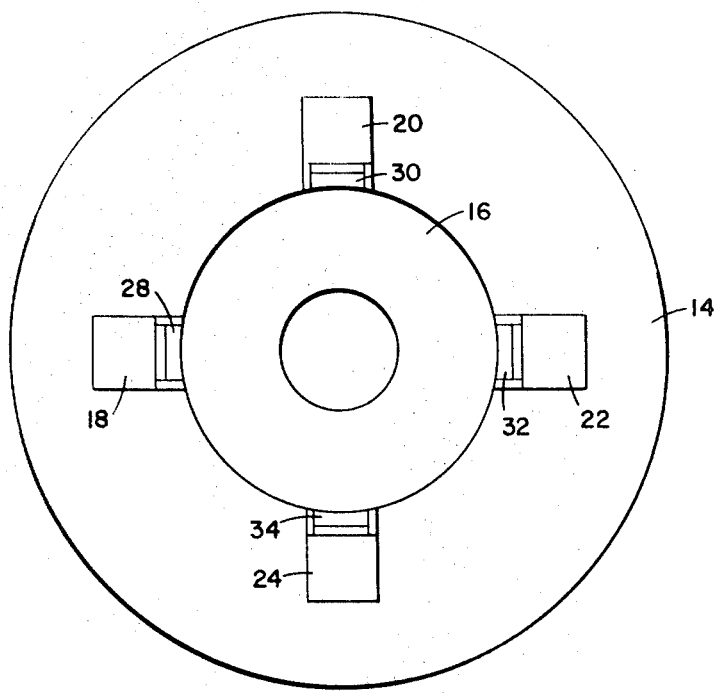
FIG. 2 is an end view of FIG. 1.

As shown in the figures, a rocket 10 includes a rocket motor 12 including convergent and divergent portions 14 and 16, respectively.

A plurality of ducts 18, 20, 22, 24 are disposed about the exit portion 26 of nozzle 12. Ducts 18, 20, 22, 24 are each provided with control ports 28, 30, 32, and 34 respectively. Each of the control ports are disposed in communication with the interior of the nozzle and a source of fluid which provides a secondary injection force against the thrust producing gases exiting the nozzle. A closure mechanism 36 is carried by the rocket and disposed for actuation by an actuating means 37 for selectively opening and closing the control ports to permit the secondary fluid to be directed therein.

The ducts are each provided with an inlet portion 38 and an exit portion 40. Inlet portion 38 is disposed in the inner surface of the ducts in communication with the nozzle exhaust. Exit portions 40 are provided with a radius to terminate substantially normal to the centerline of the nozzle. Control ports 28, 30, 32, and 34 are disposed in substantially normal relation to the nozzle's centerline and in communication with the interior of the divergent portion of the nozzle.

When the rocket motor is ignited, gas flows from the convergent portion 14 of the nozzle through the divergent portion 16 and out the exit portion 26. By providing a control force 27 through port 28 and retaining port 32 closed by closure member 36, gas from nozzle portion 16 will flow into the deflector or duct 22 but not into duct 18 since the injected flow into control port 28 will not allow the gases from the nozzle to attach to the wall of duct 18 thus, causing deflector or duct 22 to generate a side force.

If control channel 32 is left open and control channel 28 is closed by member 36, the gas will be directed out of deflector 18 causing a control force in the opposite direction.

In like manner, operation of control ports 30 and 34 of ducts 20 and 24 provide control forces from the other pair of deflectors, as desired.

It is to be understood that while the particular embodiment illustrates four deflectors evenly spaced around the nozzle, this is set forth in an illustrative sense and not in a limiting sense as, obviously, less or more deflectors may be used, if desired.

It is to be understood that the actuating means 37 for providing the communication between the interior of the nozzle and the source of secondary injection fluid may be solenoid valves or the like it being only necessary that the gases are directed through the desired deflector or deflectors in a direction which provide the necessary restoring torques on the rocket to provide proper attitude thereof.

Figure 3:
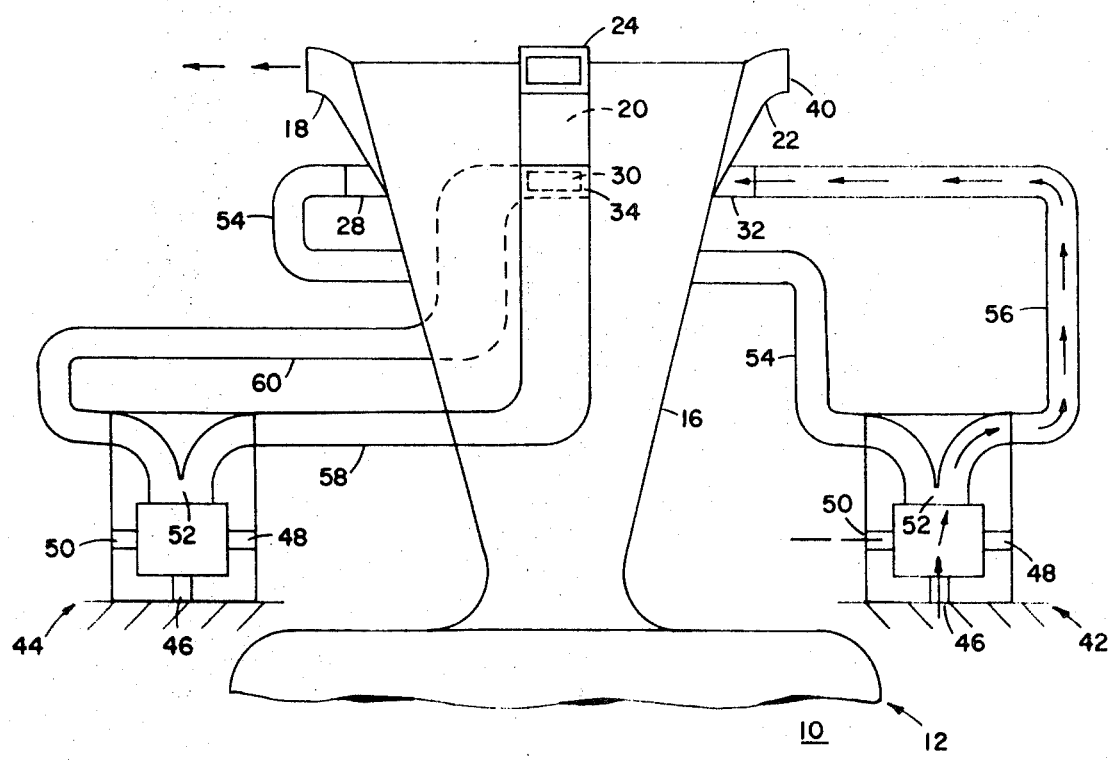
FIG. 3 is a view similar to FIG.1 utilizing fluid amplifiers for opening and closing the ducts.

As shown in FIG. 3 a pair of fluid amplifiers 42 and 44 are used for directing the secondary injection fluid into the ducts to provide deflection of the exhaust gases through the desired ducts to provide the restoring torques on the missile for attitude control thereof. In this embodiment like numerals refer to like parts. As shown in FIG. 3, fluid amplifier 42 includes an inlet 46 connected to a gas source (not shown). A pair of control ports 48 and 50 are disposed in communication with a receiving chamber 52 to control the gas flowing therethrough, in conventional manner. A pair of exit ports 54 and 56 extend from amplifier 42 in communication with control ports 28 and 32 in a push-pull arrangement. The second similar amplifier 44 is provided with exit ports 58 and 60 which are disposed in communication with control ports 30 and 34.

In the arrangement shown in FIG. 3, fluid flow from amplifier 42, for example, is shown to be directed through exit port 56 and directed into duct 22 to divert a portion of the rocket's propulsive gases through exit 40 of duct 18 to provide the control force on the rocket. Flow through exit port 54 is made to occur in control port 28 by switching the fluid amplifier in the opposite direction, in a manner well known in the art.

Any number of fluid amplifiers could be staged to obtain the required gain and proper matching with a fluidic gyro to provide an all fluidic system.

Thus, it is obvious from the foregoing that applicant has provided a high velocity direct bleed jet reaction system which bleeds high velocity gas from a low pressure region of a rocket motor nozzle and selectively directs the gas in a desired direction to achieve control of the rocket. This is achieved by fluidic means without moving parts in contact with the hot gases. By bleeding the gas from the exit cone where the pressure is very low and the temperature is less than one half of the chamber temperature, the material requirement for the deflectors are reduced considerably. The density of the gases at these high velocity bleed points is also much lower which means that these will not be any small channels to clog due to the contaminated gases.

I claim:

1. A high velocity, low pressure, direct bleed jet reaction control system for attitude control of a rocket including secondary injection fluid means for thrust vector control thereof comprising:
   (a) a rocket motor having a divergent nozzle portion for expelling exhaust gases therethrough.;
   (b) deflector means carried around said divergent portion of said motor in communication with the interior thereof and disposed for receiving gases therefrom at high velocity and low pressure, said deflector means including a plurality of ports communicating with the interior of said nozzle and said secondary injection fluid, said deflector means also including a plurality of ducts carried around said divergent portion of said nozzle, said ducts provided with an inlet portion disposed on the interior surface of said divergent nozzle portion for receiving said gases and an exit portion extending in substantially normal relation to the centerline of said rocket motor through which said gases are expelled;
   (c) actuating means for directing said secondary injection fluid into said nozzle said secondary injection fluid disposed for deflecting a portion of said exhaust gases through predetermined ones of said deflector means at high velocity and low pressure, to provide control forces on said rocket.

2. A control system as set forth in claim 1 including closure means for opening and closing said control ports.

3. A control system as set forth in claim 2 including four said ducts being secured about said nozzle in substantially equally spaced relation.

4. A control system as set forth in claim 3 wherein said control means is operable for opening a said control port on a first duct while maintaining a said control port closed on a second duct which is spaced in opposed relation to said first duct, whereby fluid is injected into said open port for impingement against said rocket exhaust gases for directing a portion of said exhaust gases out said second duct in a direction substantially normal to the centerline of said rocket motor for providing a control force on said rocket.

5. A control system as in claim 4 wherein said closure means is a member carried by said rocket in pivotal relation therewith and disposed for pivotal displacement for opening or closing said ports.

6. A control system as in claim 4 wherein said closure means is a plurality of fluidic amplifiers having outputs communicating with said control ports on said ducts.

7. A control system as in claim 6, wherein said fluid amplifiers are provided with a pair of output ports, a first of said output ports disposed in communication with a first said control port on a first duct, a second of said output ports disposed in communication with a second said control port on a second duct which is spaced in opposed relation to said first duct, whereby fluid is injected into said first control port for impingement against said rocket exhaust gases for directing a portion of said exhaust gases out said second duct in a direction substantially normal to the centerline of said rocket motor for providing a control force on said rocket.

References Cited
UNITED STATES PATENTS

| | | | |
|---|---|---|---|
| 2,702,986 | 3/1955 | Kadosch et al. | 239—265.19 |
| 2,763,125 | 9/1956 | Kadosch et al. | 239—265.25X |
| 2,914,916 | 12/1959 | Gelin et al. | 239—265.27X |
| 2,934,896 | 5/1960 | Kadosch et al. | 239—265.27X |
| 3,132,476 | 5/1964 | Conrad | 239—265.23X |
| 3,296,799 | 1/1967 | Fuentes | 239—265.23X |
| 3,300,978 | 1/1967 | Pennington | 239—265.23X |
| 3,302,884 | 2/1967 | Robinson | 239—265.17X |
| 3,370,794 | 2/1968 | Drewry et al. | 239—265.17 |
| 3,426,972 | 2/1969 | Osburn | 239—265.23X |

LLOYD L. KING, Primary Examiner

U.S. Cl. X.R.

239—265.23, 265.27